(12) United States Patent
Tsai et al.

(10) Patent No.: US 9,822,011 B2
(45) Date of Patent: Nov. 21, 2017

(54) METHOD FOR FABRICATING ORIENTED ZEOLITE FILM

(71) Applicant: HAWING GEMS TECHNOLOGY CO. LTD., Taichung (TW)

(72) Inventors: Tseng-Chang Tsai, Taichung (TW);
Shang-Tien Tsai, Taichung (TW);
Lin-Yi Huang, Taichung (TW);
Yuan-Chung Hao, Taichung (TW);
Shiaw-Tseh Chiang, Taichung (TW)

(73) Assignee: Hawing Gems Technology Co., Ltd., Taichung (TW)

( * ) Notice: Subject to any disclaimer, the term of this patent is extended or adjusted under 35 U.S.C. 154(b) by 121 days.

(21) Appl. No.: 15/043,319

(22) Filed: Feb. 12, 2016

(65) Prior Publication Data

US 2016/0236942 A1 Aug. 18, 2016

(30) Foreign Application Priority Data

Feb. 13, 2015 (TW) .............................. 104105090 A (51) Int. Cl.

| C01B 39/48 | (2006.01) |
|---|---|
| C09D 5/08 | (2006.01) |
| C23C 22/05 | (2006.01) |
| C23C 22/83 | (2006.01) |
| B01D 67/00 | (2006.01) |
| C09D 1/00 | (2006.01) |
| B01D 71/02 | (2006.01) |

(52) U.S. Cl.
CPC .......... *C01B 39/48* (2013.01); *B01D 67/0051* (2013.01); *B01D 71/028* (2013.01); *C09D 1/00* (2013.01); *C09D 5/084* (2013.01); *C23C 22/05* (2013.01); *C23C 22/83* (2013.01)

(58) Field of Classification Search
None
See application file for complete search history.

(56) References Cited

U.S. PATENT DOCUMENTS

| 2005/0014371 A1* | 1/2005 | Tsapatsis | ........... B01D 67/0051 |
|---|---|---|---|
| | | | 438/689 |
| 2008/0214686 A1* | 9/2008 | Suzuki | ................. B01D 61/362 |
| | | | 521/27 |
| 2008/0217240 A1* | 9/2008 | Yabuki | ................. B01D 61/362 |
| | | | 210/500.25 |
| 2009/0291046 A1* | 11/2009 | Yoon | ................... B01D 67/0051 |
| | | | 423/707 |
| 2012/0148828 A1* | 6/2012 | Tsapatsis | ........... B01D 67/0051 |
| | | | 428/319.1 |

(Continued)

*Primary Examiner* — Erma Cameron
(74) *Attorney, Agent, or Firm* — Muncy, Geissler, Olds & Lowe P.C.

(57) ABSTRACT

The present invention provides a method for fabricating an oriented zeolite film including preparing a metal substrate and zeolite crystal with an aspect ratio of at least 2; laying the zeolite crystal on the metal substrate to obtain a first metal substrate; applying a precursor solution containing a first structure directing agent and a solvent on the first metal substrate to obtain a second metal substrate; placing the second metal substrate in a sealed container containing a predetermined amount of the solvent; and heating the sealed container at 100-550° C. for at least 15 minutes. Thus, a continuous oriented zeolite film is formed with uniform thickness and improved anti-corrosion ability.

15 Claims, 10 Drawing Sheets

(56) References Cited

U.S. PATENT DOCUMENTS

2013/0216772 A1\* 8/2013 Yoon .................. B01D 67/0051
  428/131
2015/0147268 A1\* 5/2015 Yoon ....................... C01B 39/48
  423/700

\* cited by examiner

METHOD FOR FABRICATING ORIENTED ZEOLITE FILM

BACKGROUND OF THE INVENTION

1. Field of the Invention

The present invention generally relates to a method for fabricating a zeolite film and, more particularly, to a method for fabricating an oriented zeolite film.

2. Description of the Related Art

A conventional method for protecting metal products against corrosion includes performing surface treatment on the metal products utilizing phosphates and chromates, prolonging service life of such metal products. However, RoHS (restriction of the use of certain hazardous substance in electrical and electronic equipments) has been enforced recently in many countries, restricting the use of certain chemicals, such as hexavalent chromium, lead and mercury, in electronic equipments and daily supplies. Accordingly, a new method for surface treatment of metal products, which covers metal products with zeolite film to slow down oxidation of the metal products, has been developed for years.

A conventional method for fabricating a zeolite film utilize wet hydrothermal method, which includes adding tetraethyl orthosilicate in aqueous solution of tetrapropylammonium hydroxide and stirring for 4 hours to obtain a precursor solution, pouring the precursor solution in a reaction chamber made of Teflon, immersing a metal substrate in the precursor solution, sealing the reaction chamber, and heating the reaction chamber to 180° C. to conduct a reaction to the metal substrate for at least 12 hours. As such, a conventional zeolite film is formed on the metal substrate.

Though the conventional zeolite film protects the metal substrate from environmental moisture and oxygen, slowing down the oxidation reaction of the metal substrate; however, since zeolite crystal is randomly stacked during the procedure of such conventional method, environmental moisture and oxygen are not completely blocked. In the case that excellent anti-corrosion ability is desired, the thickness of the zeolite film must be dramatically elevated correspondingly. That is, the conventional method cannot fabricate the zeolite film with a small thickness while having sufficient anti-corrosion ability. Moreover, a large amount of the precursor solution is required in the conventional method, such that the metal substrate can be immersed therein for uniformly conducting the reaction on all surfaces of the metal substrate. However, the basic precursor solution may cause corrosion of the metal substrate during the reaction, weakening the mechanical strength of the metal substrate. Besides, the precursor solution still contains the raw materials after the reaction, such as orthosilicate and tetrapropylammonium hydroxide, and becomes waste due to the difficulty of separation of these raw materials. The waste is accumulated imperceptibly during the fabrication procedure of the conventional zeolite film; therefore, the conventional method is on the other side against environmental protection.

In light of the above, it is needed to provide a method for fabricating a zeolite film which overcomes the above problems of the conventional method.

SUMMARY OF THE INVENTION

It is therefore the objective of this invention to provide a method for fabricating a zeolite film which is oriented and has excellent anti-corrosion ability.

The present invention provides a method for fabricating an oriented zeolite film including preparing a metal substrate and zeolite crystal with an aspect ratio of at least 2; laying the zeolite crystal on the metal substrate to obtain a first metal substrate; applying a precursor solution containing a first structure directing agent and a solvent on the first metal substrate to obtain a second metal substrate; placing the second metal substrate in a sealed container containing a predetermined amount of the solvent; and heating the sealed container at 100-550° C. for at least 15 minutes.

In an embodiment of the present disclosure, the zeolite crystal grows in the b-axis thereof to form the aspect ratio.

In the embodiment of the present disclosure, the size of the zeolite crystal is of 60 nm to 3 μm, and the thickness of the zeolite crystal is of 30 nm to 1.5 μm.

In the embodiment of the present disclosure, the size of the zeolite crystal is of 300-1200 nm, and the thickness of the zeolite crystal is of 100 nm to 600 μm.

In the embodiment of the present disclosure, preparing the zeolite crystal includes conducting a hydrothermal reaction to a reaction solution under 120-180° C. for 2-30 hours. The reaction solution includes a dissolving agent, a second structure directing agent and a silicon source.

In the embodiment of the present disclosure, the reaction solution is aged under 20-40° C. for 4 hours before the hydrothermal reaction.

In the embodiment of the present disclosure, the reaction solution includes 91-92 wt % of the dissolving agent, 1-2 wt % of the second structure directing agent and 6-7 wt % of the silicon source.

In the embodiment of the present disclosure, the dissolving agent is water, the second structure directing agent is tetrapropylammonium hydroxide, and the silicon source is tetraethyl orthosilicate.

In the embodiment of the present disclosure, the second structure directing agent is the same as the first structure directing agent.

In the embodiment of the present disclosure, the container contains 0.5 ml of the solvent at most when a volume of the container is 24.4 ml.

In the embodiment of the present disclosure, concentration of the first structure directing agent in the precursor solution is of 0.01-0.06 M.

In the embodiment of the present disclosure, the first structure directing agent is tetrapropylammonium hydroxide, and the solvent is water.

In the embodiment of the present disclosure, applying the precursor solution on the first metal substrate includes immersing the first metal substrate in the precursor solution for approximately 0.5-3 seconds.

In another embodiment of the present disclosure, the method further includes calcinating the zeolite crystal, and laying the calcinated zeolite crystal on the metal substrate to obtain the first metal substrate.

In the embodiment of the present disclosure, calcinating the zeolite crystal includes heating the zeolite crystal at 300-700° C. for at least 5 minutes.

The method for fabricating the oriented zeolite film of the present disclosure lays the zeolite crystal with the aspect ratio of at least 2 on the metal substrate. Since the zeolite crystal is oriented itself, the zeolite crystal will then grow along the surface of the metal substrate without extending in other directions, such that the zeolite film is formed oriented with uniform thickness. The zeolite film is compact and completely covers the surface of the metal substrate, improving the anti-corrosion ability of the oriented zeolite film.

Furthermore, the oriented film fabricated by the method of the present disclosure is continuous and compact, thus having excellent anti-corrosion ability with only a thin layer, reducing the film thickness required of the oriented zeolite film.

Moreover, the precursor solution is applied on the first metal substrate, and the vapor of the precursor solution formed under the high-temperature and closed environment makes the zeolite crystal bind with each other, forming the oriented zeolite film. Hence, the usage of the first structure directing agent of the precursor solution is highly efficient, and additional precursor solution is not required during the heating process in the sealed container. The waste production is reduced, thus avoiding pollution to the environment caused by the method of the present disclosure.

In addition, since the zeolite crystal grows along the particular direction, the oriented zeolite has excellent anti-corrosion ability with only a small thickness of the film required. The method of the present disclosure is able to fabricate the oriented zeolite film with the thickness of the film being of 30 nm to 1.5 μm, which is transparent and can be used in the anti-corrosion application where excellent light-permeability is required. Thus, the utility of the oriented zeolite film is broadened.

Besides, the zeolite in the flat form spontaneously abuts against the metal substrate with its largest surface. Hence, it requires merely grinding the zeolite crystal to lay the zeolite crystal on the metal substrate in a uniformly distributed manner. Furthermore, since the oriented zeolite film can be fabricated within only 3 hours of heating in the sealed container, comparing with the conventional zeolite film which requires a reaction time of at least 12 hours, the reaction time is reduced, thus simplifying the fabrication procedure of the oriented zeolite film.

The present disclosure further takes advantages of calcinating the zeolite, and then forming the zeolite film with the calcinated zeolite crystal. In this way, the oriented zeolite film still remains its anti-corrosion ability, while the adhesion strength between the oriented zeolite film and the metal substrate is dramatically enhanced, prolonging service life of the oriented zeolite film.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

The present invention relates to a method for fabricating an oriented zeolite film, which includes preparing a metal substrate and zeolite crystal; laying the zeolite crystal on the metal substrate to obtain a first metal substrate; applying a precursor solution containing a first structure directing agent on the first metal substrate to obtain a second metal substrate; placing the second metal substrate in a sealed container containing a predetermined amount of solvent; and heating the sealed container at 100-550° C. for at least 15 minutes. Thus, a reaction is conducted on the second metal substrate under the temperature of 100-550° C. for at least 15 minutes, forming the oriented zeolite film on the metal substrate.

Preferably, the material of the metal substrate can be selected from the group consisted of aluminum, magnesium, iron, steel and copper. In the present embodiment, the metal substrate is made of the aluminum magnesium alloy.

Specifically, the zeolite crystal has an aspect ratio of at least 2 (i.e. at least 2:1). That is, the zeolite crystal is oriented itself. For instance, the size of the zeolite crystal can be 60 nm to 3 μm, and the thickness of the zeolite crystal can be 30 nm to 1.5 μm. The term "size of zeolite crystal" used hereinafter in the specification refers to the longest length of the zeolite crystal, and the term "thickness of zeolite crystal" used hereinafter in the specification refers to the shortest length of the zeolite crystal. The aspect ratio is defined as the ratio of the size to the thickness (aspect ratio=size/thickness).

In the present embodiment, the zeolite crystal is made of silicon without aluminum (i.e. silicalite-1), and is made by conducting a hydrothermal reaction to a reaction solution in an autoclave under 120-180° C. for 2-30 hours. The reaction solution includes a dissolving agent, a second structure directing agent and a silicon source. The dissolving agent is selected from the group consisted of water and ethanol; the second structure directing agent can be an inorganic base or an organic base containing nitrogen. For instance, the inorganic base can be potassium hydroxide, sodium hydroxide, etc; and the organic base containing nitrogen can be tetramethylammonium hydroxide (TMAOH), tetramethylammonium bromide (TMABr), tetraethylammonium hydroxide (TEAOH), tetraethylammonium bromide (TEABr), tetrapropylammonium hydroxide (TPAOH), tetrapropylammonium bromide (TPABr), etc. The silicon source can be tetramethyl orthosilicate, tetraethyl orthosilicate, tetrapropyl orthosilicate, tetrabutyl orthosilicate, tetrapentyl orthosilicate, tetradecyl orthosilicate, silicon dioxide nanoparticle, etc.

In the present embodiment, the dissolving agent is water; the second structure directing agent is tetrapropylammonium hydroxide; and the silicon source is tetraethyl orthosilicate. Besides, the reaction solution includes 91-92 wt % of the dissolving agent, 1-2 wt % of the second structure directing agent, and 6-7 wt % of the silicon source. Before the hydrothermal reaction, the reaction solution is firstly aged under 20-40° C. for 4 hours. Then, 21.62 ml of the aged reaction solution is poured into the autoclave made of tetrafluoroethylene with a volume of 24.40 ml. The hydrothermal reaction is conducted under 165° C. for 10-15 hours, followed by centrifugation and drying process to obtain the zeolite crystal with the aspect ratio of 2 to 50, the size of 300-1200 nm, and the thickness of 100-600 nm. Moreover, the zeolite crystal grows along the b-axis in a flat form. The above is merely an example for preparing the zeolite crystal, which is not taken as a limited sense.

The zeolite crystal is then laid on the metal substrate to form the first metal substrate. Specifically, the zeolite crystal can be mixed with a dispersing agent to form a coating solution, and then the coating solution can be applied on the metal substrate via spraying, brushing or dipping. In the present embodiment, the zeolite crystal is laid on the metal substrate via grinding. Specifically, since the aspect ratio of the zeolite crystal is at least 2, if the zeolite abuts against the metal substrate with a surface of the zeolite crystal that is not the largest one, the zeolite crystal cannot steadily lie down on the metal substrate. Instead, the zeolite crystal would roll along the surface of the metal substrate until lying down and abutting against the metal substrate with a surface of the zeolite crystal having a largest area among all. Hence, it merely requires spreading the zeolite crystal on the surface of the metal substrate and grinding the zeolite crystal to make the zeolite crystal lie down on the metal substrate. The term "grinding" used hereinafter in the specification refers to contacting a rubbing tool with the zeolite crystal and gently rubbing the zeolite crystal on the metal substrate along a direction parallel to the surface of the metal substrate, such that the zeolite crystal can be lie down on the surface of the metal substrate in a uniformly distributed manner due to the force applied via the rubbing tool. Thus, the first metal substrate is obtained.

Next, the precursor solution is applied on the surface of the first metal substrate to obtain the second metal substrate. The precursor solution can be sprayed on the surface of the first metal substrate. Alternatively, the first metal substrate can be immersed in the precursor solution for 0.5-3 seconds, such that the precursor solution can be uniformly adhered to the first metal substrate. The precursor solution includes the first structure directing agent and the solvent, and the solvent can be selected from the group consisted of water and ethanol. The first structure directing agent can be an inorganic base or an organic base containing nitrogen. For instance, the inorganic base can be potassium hydroxide, sodium hydroxide, etc; and the organic base containing nitrogen can be tetramethylammonium hydroxide, tetramethylammonium bromide, tetraethylammonium hydroxide, tetraethylammonium bromide, tetrapropylammonium hydroxide, tetrapropylammonium bromide, etc. The first and second structure directing agents can be the same or different from each other. Preferably, the oriented zeolite film is made using the same first and second structure directing agents, which is beneficial to form the zeolite film in a continuous manner. In the present embodiment, the first structure directing agent is tetrapropylammonium hydroxide, and the solvent is water. The concentration of the first structure directing agent in the precursor solution is 0.01-0.06 M. The first metal substrate is immersed in the precursor solution, and is pulled out immediately after immersed for approximately 1 second to obtain the second metal substrate. It is worth noting that since the zeolite abuts against the metal substrate with the surface of the zeolite crystal having the largest area, the zeolite crystal can be tightly adhered to the metal substrate by Van der Waals interaction, thus may not easily come off from the metal substrate when immersed in the precursor solution. Preferably, the precursor solution contains 0.02-0.04 M of the first structure directing agent, so as to make the zeolite crystal compactly and uniformly stacked.

The metal substrate is then placed in the sealed container containing the predetermined amount of the solvent, and is heat at 100-550° C. for at least 15 minutes to 60 hours. During the reaction in the sealed container, the zeolite crystal grows along the b-axis to eliminate the gap between each other. Thus, the method of the present disclosure can fabricate the oriented zeolite film which is continuous with a wide area. The thickness of the zeolite film can be optimized by adjusting the layer number of the zeolite crystal stacked on the metal substrate. In the present embodiment, the thickness of the oriented zeolite film is preferably 100 nm to 1.5 μm, such that the zeolite film is transparent, increasing the utility value of the oriented zeolite film. Furthermore, the second metal substrate is heated without contacting the solvent. For instance, the solvent is placed at the lower part of the container, and the second metal substrate is kept at the upper part of the container to avoid contacting the solvent. The "predetermined amount" of the solvent indicates that under the temperature of 100-550° C. all the solvent contained in the container will completely be in gaseous state, and will not exist in liquid state. Finding the saturated vapor pressure according to the solvent type to calculate the maximum value of the predetermined amount based on the heating temperature can be readily appreciated and established by persons ordinarily skilled in the art. If the amount of the solvent contained in the container exceeds the maximum value of the predetermined amount, the solvent will equilibrates between gaseous and liquid states, forming lots of micro drops in the compartment inside the container. These micro drops of the solvent may adhere to the second metal substrate, adversely affecting the thickness uniformity and mechanical strength of the oriented zeolite film. Thus, the oriented zeolite film may be formed with an uneven thickness and tends to be broken easily. In the present embodiment, the second metal substrate is placed in the sealed container with a volume of 24.40 ml, and the sealed container is an autoclave made of tetrafluoroethylene. The container contains 0.01-0.02 ml of the solvent before heated, with the solvent being water.

Furthermore, after preparation of the zeolite crystal, the zeolite crystal can further be calcinated before being laid on the metal substrate. Specifically, the zeolite crystal is heated at a particular temperature for a period of time to remove the second structure directing agent adhered on the zeolite crystal. It is worth noting that the second structure directing agent may not be completely removed under low temperature; alternatively, high temperature may cause damage to the structure of the zeolite crystal. Similarly, a short period of calcination may not be sufficient for removal of the second structure directing agent; however, a long period of calcination may cause unnecessarily waste of energy. In the present embodiment, the zeolite crystal is calcinated under 400-700 t for 5 minutes to 8 hours, such that the second structure directing agent can be removed.

Theoretically, since the second structure directing agent may adhere to the zeolite crystal and fill the pores of the zeolite crystal, it is supposed that the oriented zeolite film made of non-calcinated zeolite crystal may posses better anti-corrosion ability because of the pores of the zeolite crystal filled by the second structure directing agent. To our surprise, the present disclosure discovers that utilizing the calcinated zeolite crystal to fabricate the oriented zeolite film does not significantly affect the anti-corrosion ability, but the adhesion strength between the oriented zeolite film and the metal substrate can be dramatically enhanced. Thus, the oriented zeolite film does not come off easily from the metal substrate.

It is worth noting that the reaction of the second substrate is preferably conducted under 100-300° C. when using the non-calcinated zeolite crystal, so as to prevent decomposition of the second structure directing agent, enhancing the anti-corrosion ability of the oriented zeolite film. On the other hand, when the calcinated zeolite crystal is utilized, the second metal substrate can react under a temperature of 550° C. at most for improving binding rate of the zeolite crystal, which is beneficial to the anti-corrosion ability of the oriented zeolite film.

According to the above, the method for fabricating the oriented zeolite film of the present disclosure uses only a small amount of the precursor solution applied on the first metal substrate to obtain the second metal substrate, without the need of additional precursor solution during the heating process. Hence, the required amount of the precursor solution can be significantly reduced, and the method of the present disclosure is able to sufficiently reduce the waste production. Besides, by laying the zeolite crystal on the metal substrate to make each zeolite crystal abut against the metal substrate with its largest surface and then conduct the reaction on the second metal substrate, the zeolite crystal can grow along the surface of the metal substrate and bind with each other, forming the zeolite film which is oriented. The oriented zeolite film is continuous and completely covers the surface of the metal substrate with improved anti-corrosion ability, thus requiring a thickness of only hundreds of nanometers to provide sufficient anti-corrosion function.

For analyzing the anti-corrosion ability of the oriented zeolite film and observing the morphology of the zeolite crystal, a series of experiments are carried out as follows.

(A) Morphology of the Zeolite Crystal

The preparation of the zeolite crystal of this experiment includes adding 1.08 g of 40% tetrapropylammonium hydroxide in 19.15 g deionized water, and further mixing with 1.39 g tetraethyl orthosilicate to form the reaction solution. The reaction solution is firstly aged under 25° C. for 4 hours, and then is poured in the autoclave and hydrothermally reacted under 165° C. for 10 hours, 12 hours, 14 hours and 15 hours, forming the zeolite crystal of Groups A1-A4, respectively. The morphology of the zeolite crystal of Groups A1-A4 are shown in FIGS. 1-4, which are taken under scanning electron microscope (SEM).

Each of the zeolite crystal of Groups A1-A4 has the aspect ratio of at least 2, and grows along the b-axis. With references to FIG. 1, when the reaction time is 10 hours (i.e. Group A1), the size of the zeolite crystal is approximately 1-2 μm. With references to FIGS. 2-3, the size of the zeolite crystal is approximately 500-800 nm, and the thickness thereof is approximately 300-500 nm.

(B) Appearance of the First Metal Substrate

The zeolite crystal of the Group A4 above is spread on the first metal substrate made of aluminum magnesium alloy, and is laid on the metal substrate utilizing a grinding machine with a rotation speed set at 60 rpm to obtain the first metal substrate. The SEM images of the first metal substrate of Group B are provided as FIGS. 5a and 5b.

Figure 1:
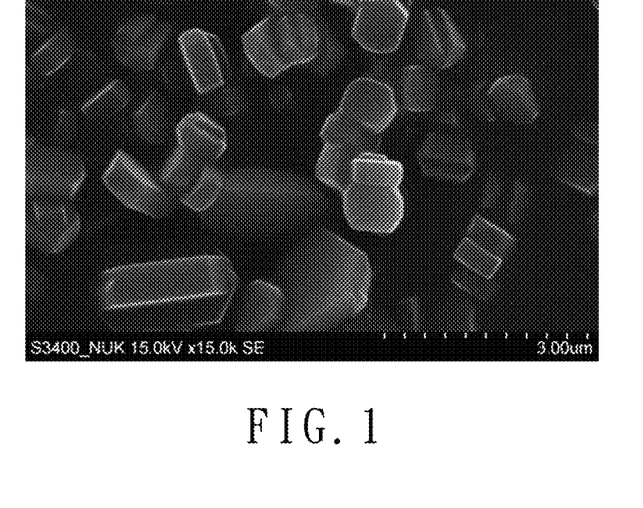
FIG. 1 is a SEM image of the zeolite crystal of Group A1.
Figure 2:
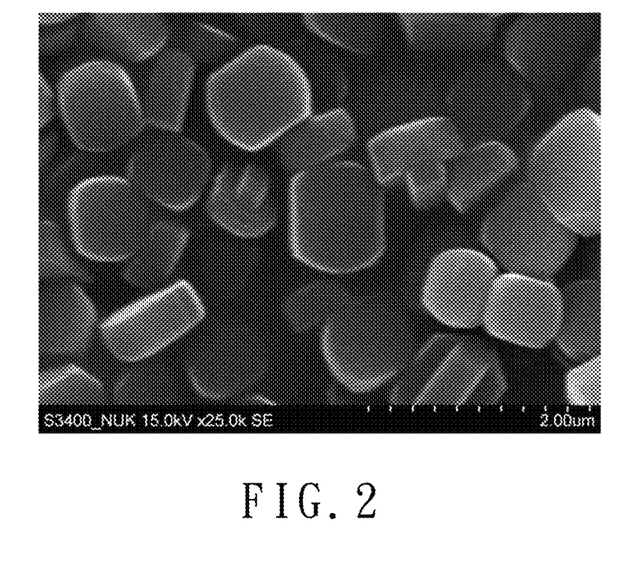
FIG. 2 is a SEM image of the zeolite crystal of Group A2.
Figure 3:
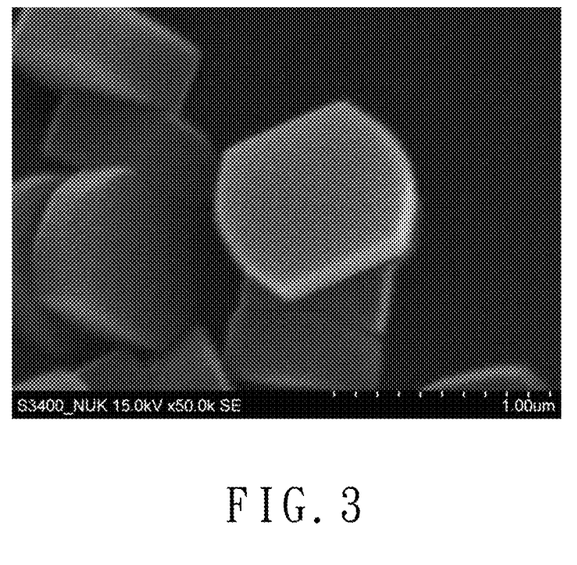
FIG. 3 is a SEM image of the zeolite crystal of Group A3.
Figure 4:
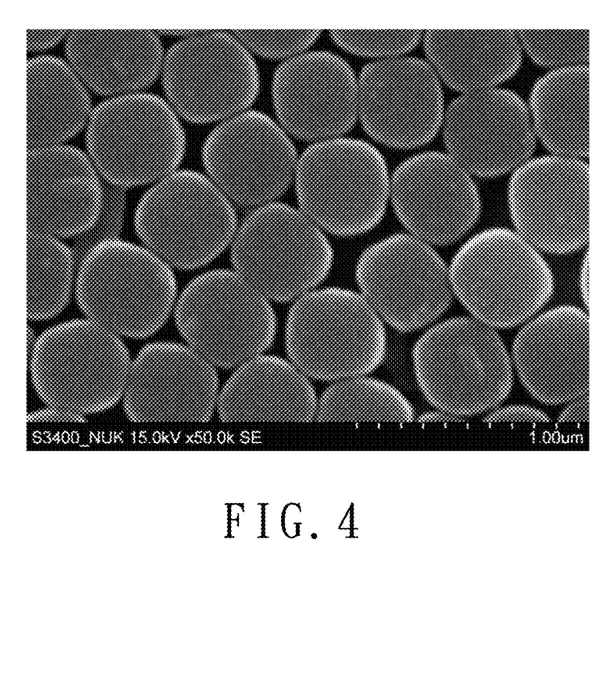
FIG. 4 is a SEM image of the zeolite crystal of Group A4.
Figure 5A:
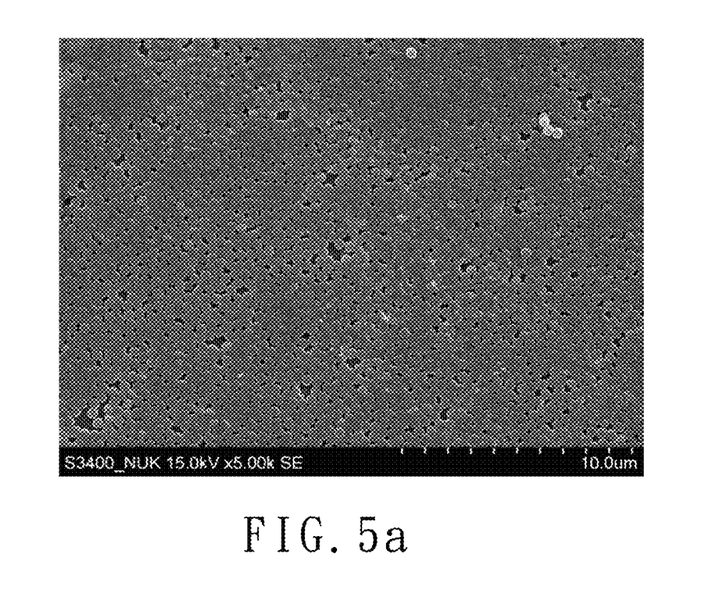
FIG. 5a is a vertical SEM image of the first metal substrate of Group B.
Figure 5B:
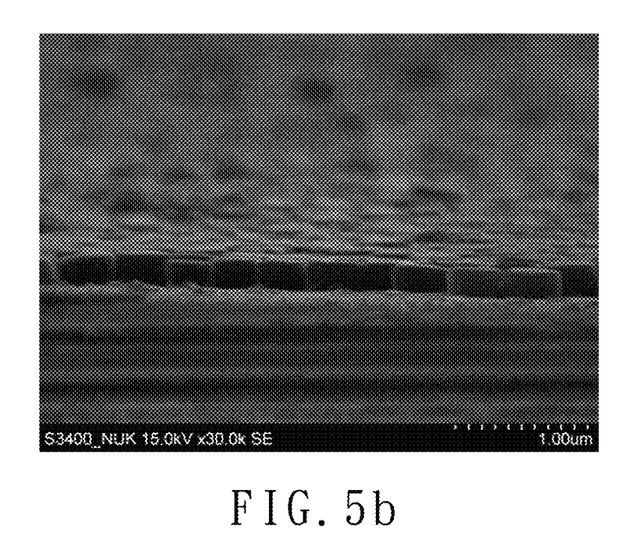
FIG. 5b is a cross sectional SEM image of the first metal substrate of Group B.
Figure 6A:
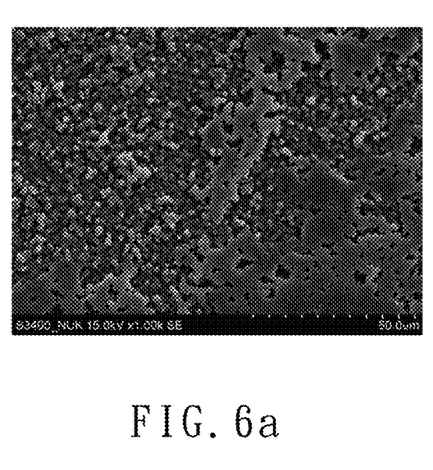
FIG. 6a is a vertical SEM image of the oriented zeolite film of Group C1.
Figure 6B:
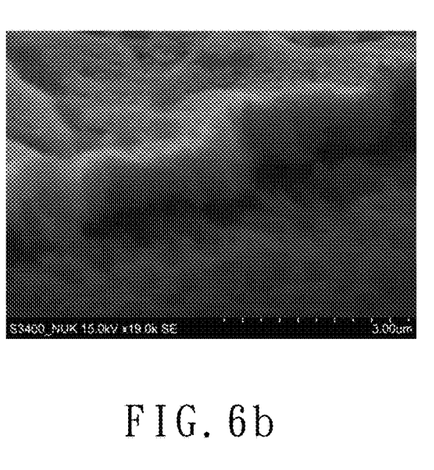
FIG. 6b is a cross sectional SEM image of the oriented zeolite film of Group C1.
Figure 6C:
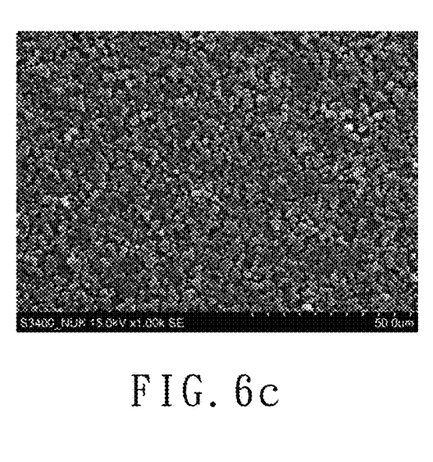
FIG. 6c is a vertical SEM image of the oriented zeolite film of Group C2.
Figure 6D:
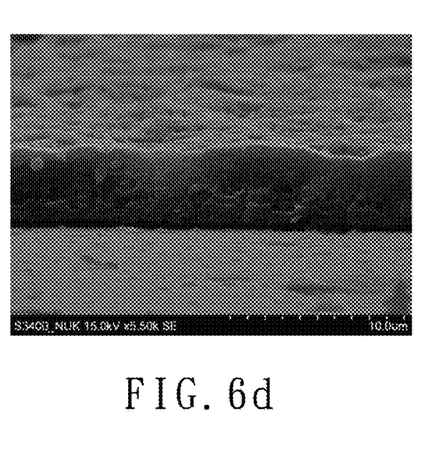
FIG. 6d is a cross sectional SEM image of the oriented zeolite film of Group C2.

With references to FIGS. 5a and 5b, which are vertical and cross sectional SEM images of the first metal substrate, it can be seen that the zeolite crystal is laid on the metal substrate with the largest surface of the zeolite crystal abutting against the metal substrate through directly spreading and grinding processes. Besides, the thickness of the zeolite crystal layer adhered on the metal substrate can be optimized according to need by adjusting the rotational speed of the grinding machine.

(C) the Effect of the Concentration of the First Structure Directing Agent on the Appearance of the Oriented Zeolite Film This experiment uses the first metal substrate of Group B and applies the precursor solution containing 0.02 M of the first structure directing agent on the first metal substrate to obtain the second metal substrate. The second metal substrate is then placed in the sealed container containing 0.01 ml of the solvent and is heated at 150° C. for 3 hours, forming the oriented zeolite film of Group C1. The oriented zeolite film of Group C2 is fabricated using the precursor solution containing 0.04 M of the first structure directing agent, with the other setting and steps being the same as those of Group C1. The appearances of Groups C1 and C2 are observed using SEM, and the images are provided as FIGS. 6a and 6b (Group C1), FIGS. 6c and 6d (Group C2). As shown in FIGS. 6a-6d, the zeolite crystal of Group C1 binds with each other to form a thin film, so does the zeolite crystal of Group C2. Apparently, the oriented zeolite film can be fabricated utilizing the method of the present disclosure.

(D) the Effect of Heating Time on the Oriented Zeolite Film

Figure 7:
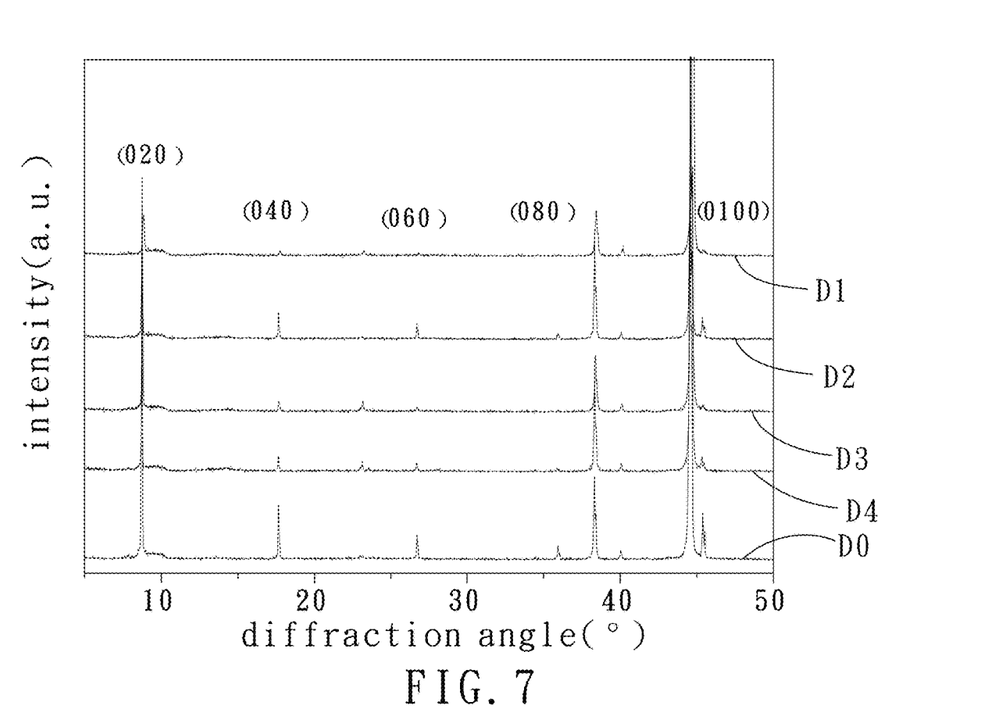
FIG. 7 is XRD patterns of the oriented zeolite films of Groups D1-D4 with Group D0 for reference.

The oriented zeolite films of this experiment are fabricated using the same setting and steps as Group C2 above, with the reaction time of the second metal substrate in the sealed container altered to 3 hours (Group D1), 6 hours (Group D2), 12 hours (Group D3), and 60 hours (Group D4). The first metal substrate is taken as a reference group (Group D0). Groups D0-D4 are analyzed with X-ray diffraction (XRD), and the results are shown in FIG. 7. With references to FIG. 7, it can be seen that each of these oriented zeolite films possesses the diffraction peaks with the b-axis characteristics, such as those characteristic peaks at (020), (040), (060), (080) and (0100). This is the evidence showing that the zeolite film fabricated using the zeolite crystal is certainly oriented, and grows along the b-axis.

Figure 8:
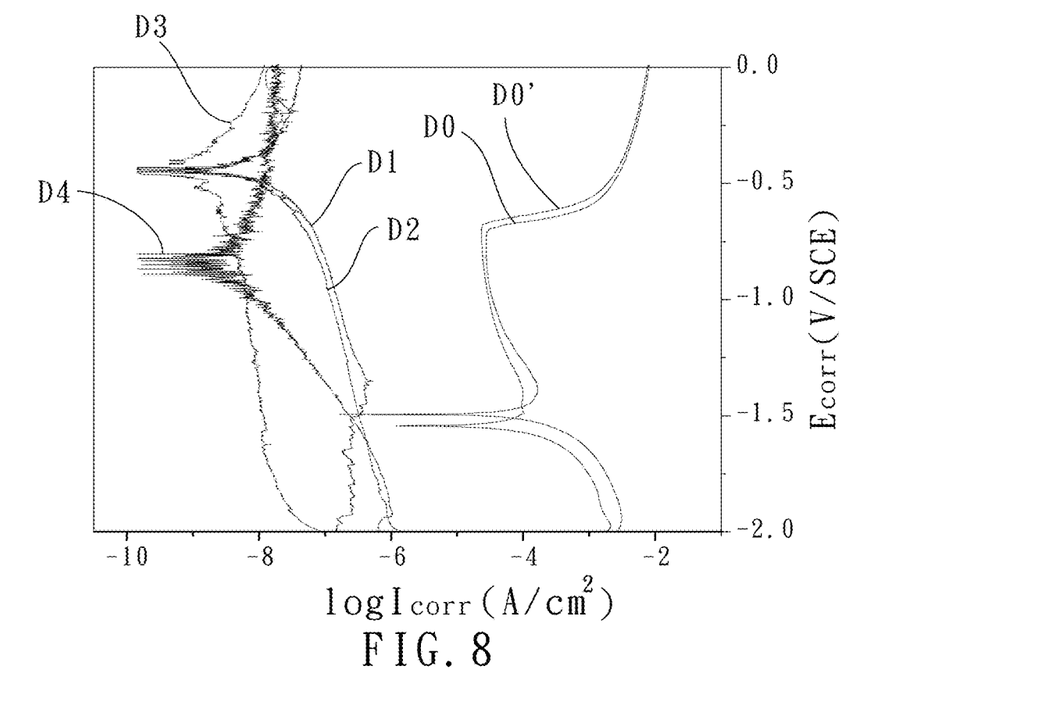
FIG. 8 is a Tafel plot of the oriented zeolite films of Groups D1-D4 with Groups D0 and D0' for reference.

Moreover, a further reference group (Group D0') is provided, which is simply the metal substrate. Groups D0', D0-D4 are analyzed using Tafel plot for their electrochemical characteristics, i.e. corrosion potential versus SCE ($E_{corr}$), log of corrosion current density (log $I_{corr}$), polarization resistance (Rp), and corrosion rate (R). The potential range is set at −2V to 2V, and the scan rate is set at 5 mV/s. In the Tafel plot analysis, a circle having a diameter of 1 cm contacts with an analyzing solution, with the analyzing solution being 3 wt % sodium chloride solution. The resulted values and diagrams are shown in Table 1 below and FIG.

8. The electrochemical analyzer used in this analysis is made by CH instruments, Inc., with serial No. CHI 627D.

TABLE 1

Results of electrochemical analysis of Groups D0' and D0-D4

| Group No. | $E_{corr}$ (V/SCE) | $logI_{corr}$ (A/cm$^2$) | Rp (Ω-cm$^2$) | R (mpy) |
| --- | --- | --- | --- | --- |
| Group D0' | −1.54 | −3.84 | 4 × 10$^2$ | 76.48 |
| Group D0 | −1.49 | −3.76 | 3 × 10$^2$ | 91.65 |
| Group D1 | −0.44 | −8.13 | 8 × 10$^6$ | 3.94 × 10$^{-3}$ |
| Group D2 | −0.45 | −8.42 | 6 × 10$^6$ | 2.02 × 10$^{-3}$ |
| Group D3 | −0.46 | −9.05 | 2 × 10$^7$ | 4.73 × 10$^{-4}$ |
| Group D4 | −0.87 | −8.99 | 1 × 10$^7$ | 5.42 × 10$^{-4}$ |

With references to Table 1 and FIG. 8, comparing to the corrosion potentials of Groups D0 and D0' being −1.49 and −1.54 V/SCE, the corrosion potentials of Groups D1-D4 are −0.44 V/SCE, −0.45 V/SCE, −0.46 V/SCE and −0.87 V/SCE, respectively. The low corrosion potentials of Groups D1-D4 indicate improved anti-corrosion ability when comparing with the metal substrate and the first metal substrate. Besides, Table 1 shows that a heating time of 3 hours is sufficient to dramatically improve the anti-corrosion ability. The anti-corrosion function of the oriented zeolite film fabricated by the method of the present disclosure can also be verified by the values of corrosion current density, polarization resistance and corrosion rate shown above.

(E) the Effect of Heating Temperature on the Oriented Zeolite Film

The oriented zeolite films of this experiment are fabricated using the same setting and steps as Group C1, with the heating time set at 3 hours and the heating temperature adjusted to 150° C. (Group E1), 160° C. (Group E2), 170° C. (Group E3) and 180° C. (Group E4). The metal substrate is taken as the reference group (Group E0). The XRD results of these groups are provided in FIG. 9, and the electrochemical characteristics of these groups analyzed using Tafel plot are provided in Table 2 and FIG. 10.

TABLE 2

Results of electrochemical analysis of Groups E0-E4

| Group No. | $E_{corr}$ (V/SCE) | $logI_{corr}$ (A/cm$^2$) | Rp (Ω-cm$^2$) | R (mpy) |
| --- | --- | --- | --- | --- |
| Group E0 | −1.54 | −3.84 | 4 × 10$^2$ | 76.48 |
| Group E1 | −1.48 | −3.89 | 4 × 10$^2$ | 68 |
| Group E2 | −1.44 | −4.88 | 2 × 10$^3$ | 7 |
| Group E3 | −1.03 | −7.34 | 7 × 10$^5$ | 2 × 10$^{-2}$ |
| Group E4 | −0.88 | −8.13 | 3 × 10$^6$ | 4 × 10$^{-3}$ |

Figure 9:
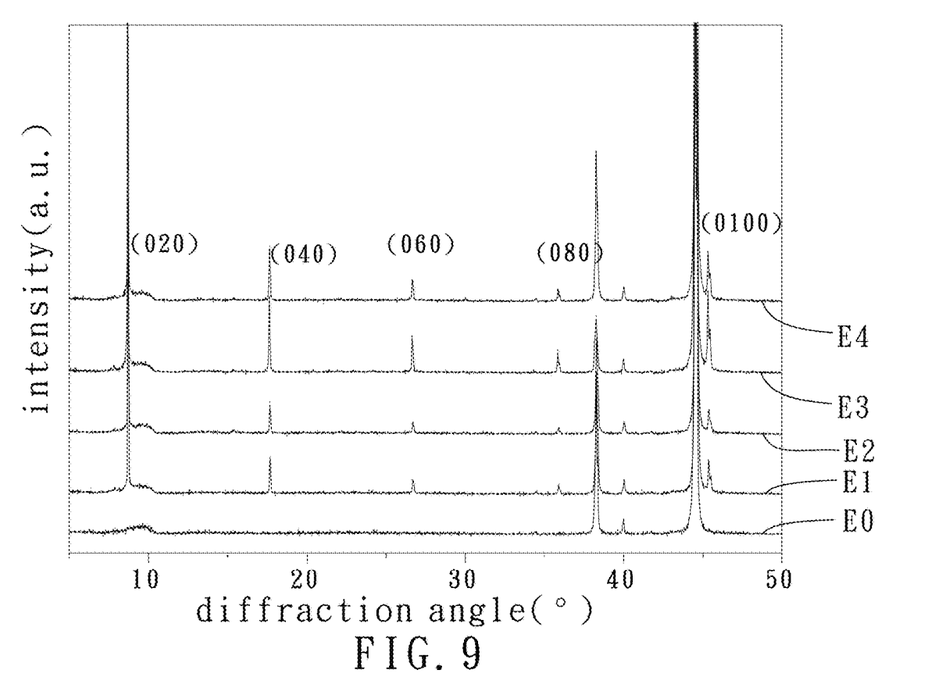
FIG. 9 is XRD patterns of the oriented zeolite films of Groups E1-E4 with Group E0 for reference.
Figure 10:
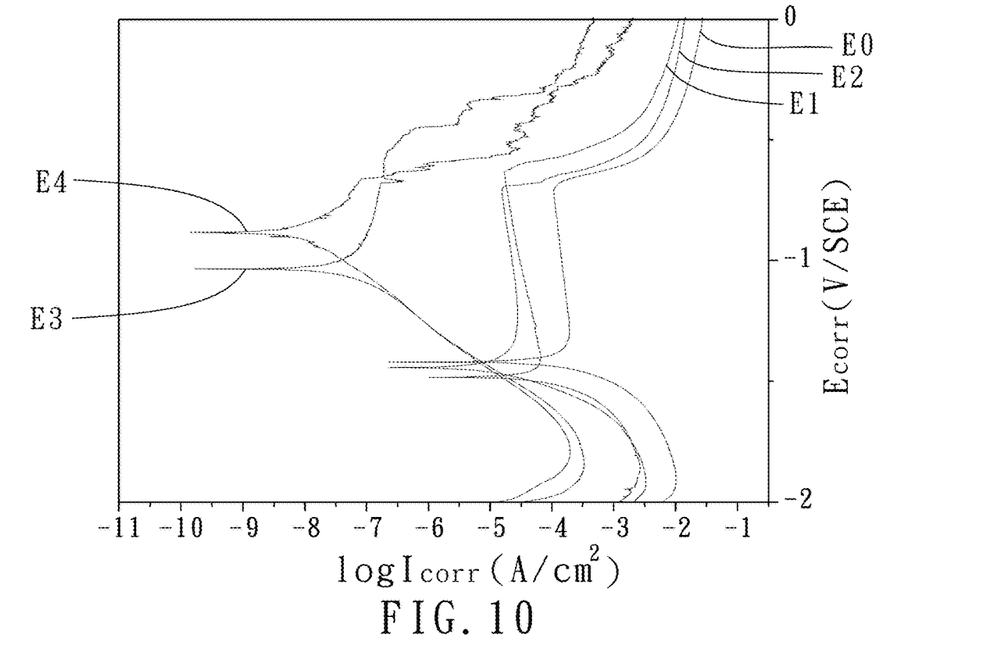
FIG. 10 is a Tafel plot of the oriented zeolite films of Groups E1-E4 with Group E0 for reference.

With references to FIG. 9, it can be seen that the oriented zeolite film fabricated using the zeolite crystal does certainly grow along the b-axis. Furthermore, with references to Table 2 and FIG. 10, when the second metal substrate is placed in the sealed container and reacts under 150° C. the corrosion rate has already been lower than the metal substrate. When the reaction temperature is further elevated to 180° C. the anti-corrosion ability is improved significantly, proving that the method of the present disclosure can definitely produce the oriented zeolite film with anti-corrosion function.

Figure 11A:
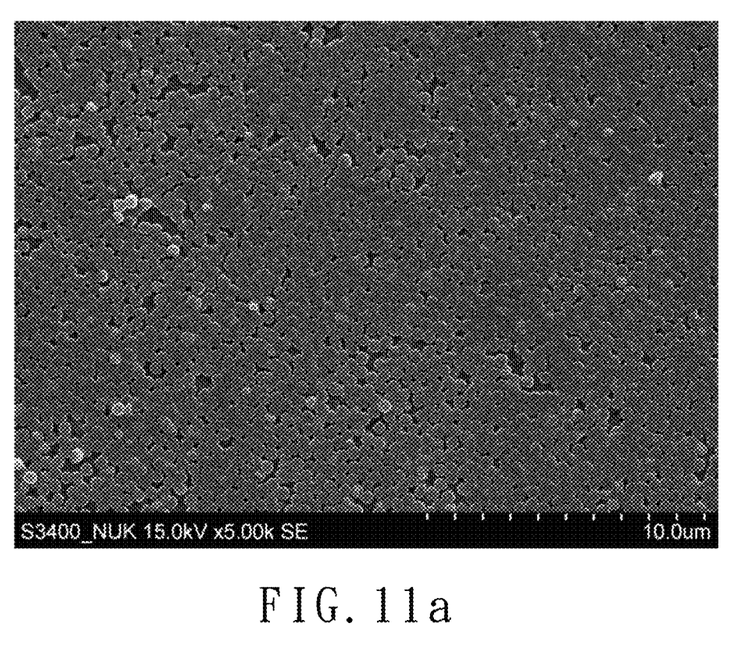
FIG. 11a is a vertical SEM image of the oriented zeolite film of Group E1.
Figure 11B:
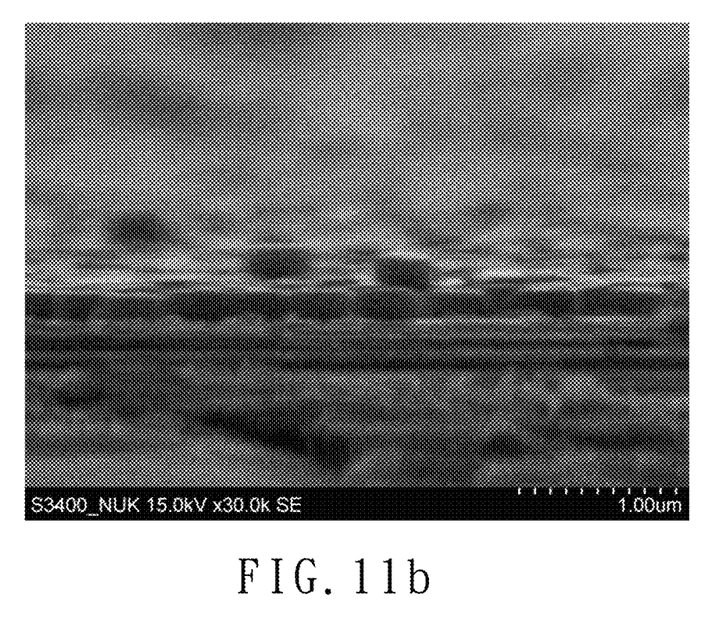
FIG. 11b is a cross sectional SEM image of the oriented zeolite film of Group E1.
Figure 12A:
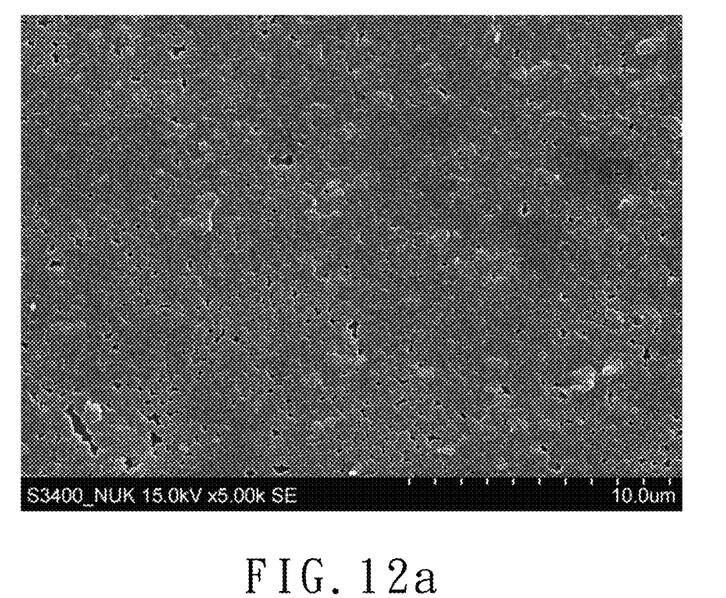
FIG. 12a is a vertical SEM image of the oriented zeolite film of Group E2.
Figure 12B:
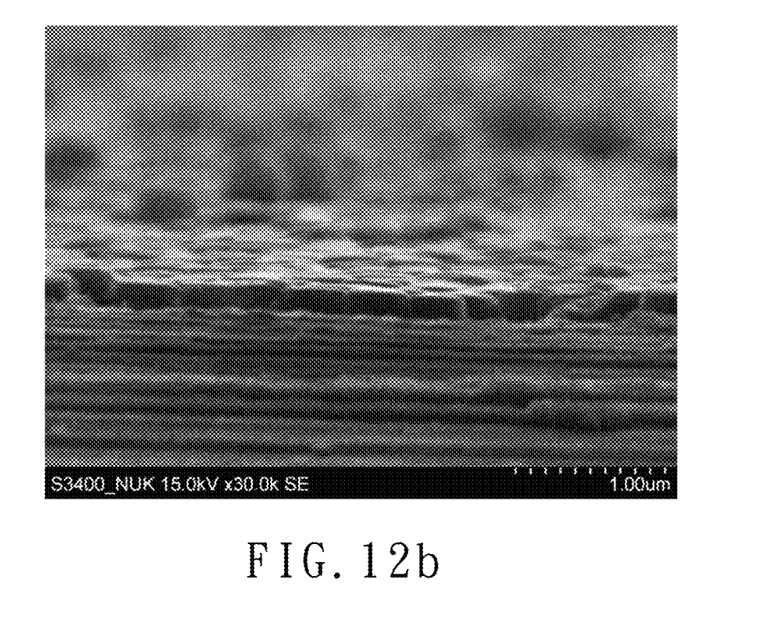
FIG. 12b is a cross sectional SEM image of the oriented zeolite film of Group E2.
Figure 13A:
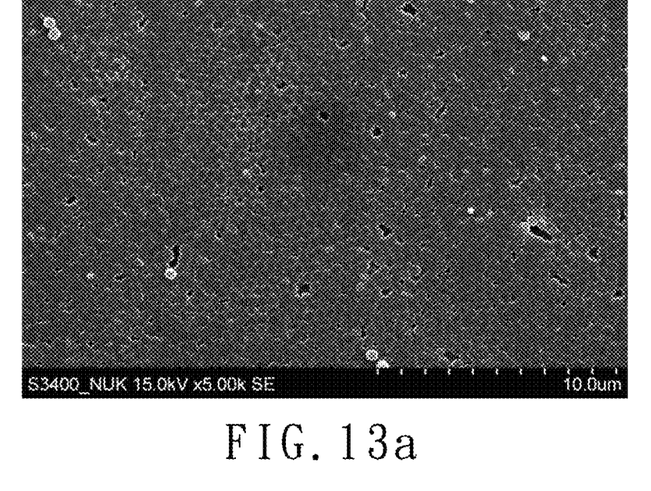
FIG. 13a is a vertical SEM image of the oriented zeolite film of Group E3.
Figure 13B:
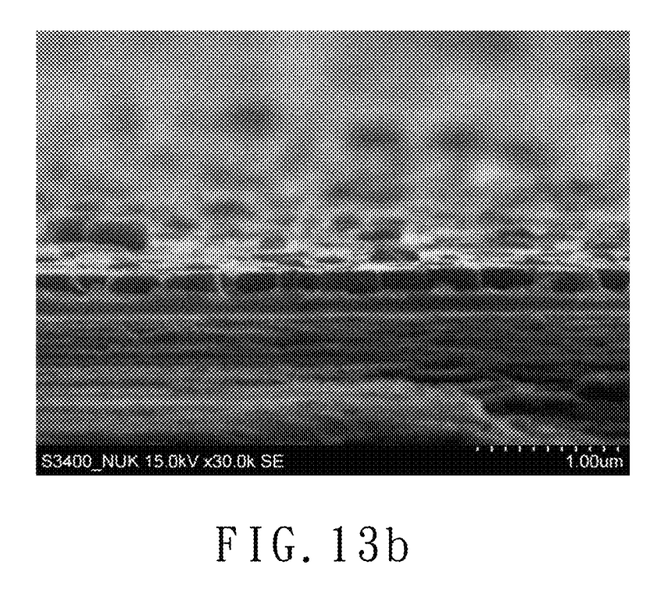
FIG. 13b is a cross sectional SEM image of the oriented zeolite film of Group E3.
Figure 14:
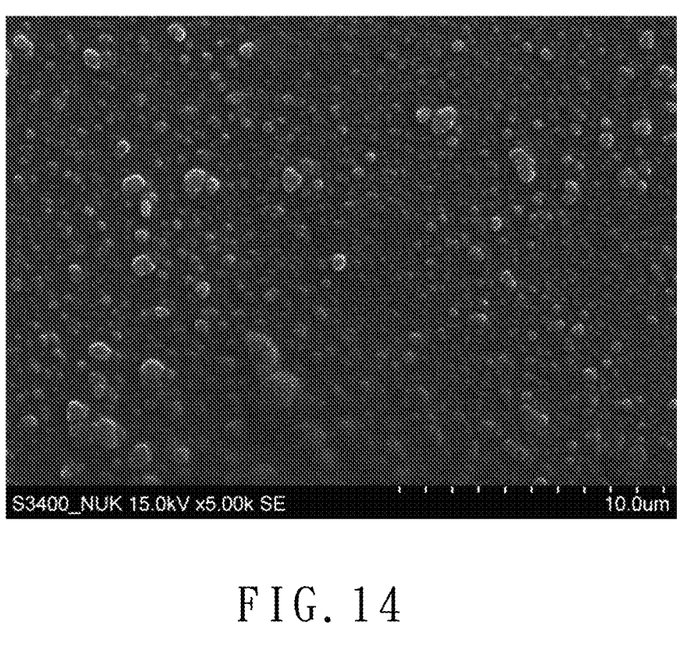
FIG. 14 is a vertical SEM image of the oriented zeolite film of Group E4.

Moreover, this experiment further provides SEM images of the oriented zeolite films of Groups E1-E4, with FIGS. 11a and 11b referred to Group E1, FIGS. 12a and 12b referred to Group E2, FIGS. 13a and 13b referred to Group E3, and FIG. 14 referred to Group E4. With references to these SEM images, it can be seen that the method of the present disclosure is able to fabricate the oriented zeolite film with a large area and completely covering the metal substrate. The oriented zeolite film is provided with uniform thickness of 100-300 nm.

(F) the Oriented Zeolite Film Fabricated Using the Calcinated Zeolite Crystal

In this experiment, the zeolite crystal of Group A4 is placed in a crucible, and is calcinated in a furnace with air circulation and temperature set at 540° C. for 6 hours for removal of the second structure directing agent. The calcinated zeolite crystal is then laid on the metal substrate after cool down to room temperature, forming the first metal substrate of Group F0 for reference. The precursor solution containing 0.02 M of tetrapropylammonium hydroxide as the first structure directing agent and water is applied on the first metal substrate to obtain the second metal substrate. The second metal substrate is then placed in the sealed container containing the solvent and is heated at 220° C. for 3 hours, forming the oriented zeolite film of Group F1. The oriented zeolite film of Group F2 is fabricated using potassium hydroxide as the first structure directing agent, with the other setting and steps being the same as Group F1.

Besides, the zeolite film of Group D1 is placed in the same furnace and is calcinated at 540° C. for 3 hours to form the zeolite film of Group D1C, which serves as another reference for comparison of the effect of calcination after film formation. The electrochemical characteristics of Groups F0-F2, D1 and D1C are analyzed using Tafel plot, with the setting being the same as the above. Peeling test is further conducted to Groups F0-F2, D1 and D1C, with the peeling force set at 5 N and 25 N. The results of the electrochemical analysis and peeling test are listed in Table 3 below.

TABLE 3

Results of electrochemical analysis and peeling test of Groups F0-F2, D1 and D1C

| Group No. | $E_{corr}$ (V/SCE) | $logI_{corr}$ (A/cm$^2$) | Rp (Ω-cm$^2$) | R (mpy) | Peeling test (5N) | Peeling test (25N) |
| --- | --- | --- | --- | --- | --- | --- |
| Group F0 | −1.54 | −3.76 | 4 × 10$^2$ | 76.5 | Peeled | Peeled |
| Group F1 | −1.00 | −8.03 | 4 × 10$^6$ | 4.9 × 10$^{-3}$ | Unpeeled | Unpeeled |
| Group F2 | −1.52 | −4.50 | 1 × 10$^3$ | 37.0 | Unpeeled | Unpeeled |
| Group D1 | −0.44 | −8.13 | 8 × 10$^6$ | 3.9 × 10$^{-3}$ | Unpeeled | Peeled |
| Group D1C | −1.41 | −4.46 | 1 × 10$^3$ | 38.9 | Unpeeled | Peeled |

With references to Table 3, comparing with Group F0, the oriented zeolite films of Groups F1 and F2 show educed corrosion potential, corrosion current density, polarization resistance and corrosion rate, indicating improved anti-corrosion ability. Besides, comparing with Group D1, it is clear that since Groups F1 and F2 use the calcinated zeolite crystal, the fabricated zeolite films remain the anti-corrosion ability, while having enhanced adhesion strength with the metal substrate, improving service life of the oriented zeolite crystal. Furthermore, with references to Group D1C, if the oriented zeolite film is calcinated after film formation, the adhesion strength of the calcinated oriented zeolite film cannot be improved, while the anti-corrosion ability thereof drops dramatically.

In light of the above, the method for fabricating the oriented zeolite film of the present disclosure lays the zeolite crystal with the aspect ratio of at least 2 on the metal substrate. Since the zeolite crystal is oriented itself, the zeolite crystal will then grow along the surface of the metal substrate without extending in other directions, such that the zeolite film is formed oriented with uniform thickness. The zeolite film is compact and completely covers the surface of the metal substrate, improving the anti-corrosion ability of the oriented zeolite film.

Furthermore, the oriented film fabricated by the method of the present disclosure is continuous and compact, thus having excellent anti-corrosion ability with only a thin layer, reducing the film thickness required of the oriented zeolite film.

Moreover, the precursor solution is applied on the first metal substrate, and the vapor of the precursor solution formed under the high-temperature and closed environment makes the zeolite crystal bind with each other, forming the oriented zeolite film. Hence, the usage of the first structure directing agent of the precursor solution is highly efficient, and additional precursor solution is not required during the heating process in the sealed container. The waste production is reduced, thus avoiding pollution to the environment caused by the method of the present disclosure.

In addition, since the zeolite crystal grows along the particular direction, the oriented zeolite has excellent anti-corrosion ability with only a small thickness of the film required. The method of the present disclosure is able to fabricate the oriented zeolite film with the thickness of the film being of 30 nm to 1.5 μm, which is transparent and can be used in the anti-corrosion application where excellent light-permeability is required. Thus, the utility of the oriented zeolite film is broadened.

Besides, the zeolite in the flat form spontaneously abuts against the metal substrate with its largest surface. Hence, it requires merely grinding the zeolite crystal to lay the zeolite crystal on the metal substrate in a uniformly distributed manner. Furthermore, since the oriented zeolite film can be fabricated within only 3 hours of heating in the sealed container, comparing with the conventional zeolite film which requires a reaction time of at least 12 hours, the reaction time is reduced, thus simplifying the fabrication procedure of the oriented zeolite film.

The present disclosure further takes advantages of calcinating the zeolite, and then forming the zeolite film with the calcinated zeolite crystal. In this way, the oriented zeolite film still remains its anti-corrosion ability, while the adhesion strength between the oriented zeolite film and the metal substrate is dramatically enhanced, prolonging service life of the oriented zeolite film.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A method for fabricating an oriented zeolite film, comprising:
    preparing a metal substrate;
    preparing zeolite crystal with an aspect ratio of at least 2;
    laying the zeolite crystal on the metal substrate to obtain a first metal substrate;
    applying a precursor solution containing a first structure directing agent and a solvent on the first metal substrate to obtain a second metal substrate;
    placing the second metal substrate in a sealed container containing a predetermined amount of the solvent; and
    heating the sealed container at 100-550° C. for at least 15 minutes.

2. The method for fabricating the oriented zeolite film of claim 1, wherein the zeolite crystal grows in the b-axis thereof to form the aspect ratio.

3. The method for fabricating the oriented zeolite film of claim 2, wherein the size of the zeolite crystal is of 60 nm to 3 μm, and wherein the thickness of the zeolite crystal is of 30 nm to 1.5 μm.

4. The method for fabricating the oriented zeolite film of claim 3, wherein the size of the zeolite crystal is of 300-1200 nm, and wherein the thickness of the zeolite crystal is of 100 nm to 600 μm.

5. The method for fabricating the oriented zeolite film of claim 1, wherein preparing the zeolite crystal comprises conducting a hydrothermal reaction to a reaction solution under 120-180° C. for 2-30 hours, and wherein the reaction solution comprises a dissolving agent, a second structure directing agent and a silicon source.

6. The method for fabricating the oriented zeolite film of claim 5, wherein the reaction solution is aged under 20-40° C. for 4 hours before the hydrothermal reaction.

7. The method for fabricating the oriented zeolite film of claim 5, wherein the reaction solution comprises 91-92 wt % of the dissolving agent, 1-2 wt % of the second structure directing agent and 6-7 wt % of the silicon source.

8. The method for fabricating the oriented zeolite film of claim 5, wherein the dissolving agent is water, wherein the second structure directing agent is tetrapropylammonium hydroxide, and wherein the silicon source is tetraethyl orthosilicate.

9. The method for fabricating the oriented zeolite film of claim 5, wherein the second structure directing agent is the same as the first structure directing agent.

10. The method for fabricating the oriented zeolite film of claim 1, wherein the container contains 0.5 ml of the solvent at most when a volume of the container is 24.4 ml.

11. The method for fabricating the oriented zeolite film of claim 1, wherein concentration of the first structure directing agent in the precursor solution is of 0.01-0.06 M.

12. The method for fabricating the oriented zeolite film of claim 1, wherein the first structure directing agent is tetrapropylammonium hydroxide, and wherein the solvent is water.

13. The method for fabricating the oriented zeolite film of claim 1, wherein applying the precursor solution on the first metal substrate comprises immersing the first metal substrate in the precursor solution for approximately 0.5-3 seconds.

14. The method for fabricating the oriented zeolite film of claim 1, further comprising calcinating the zeolite crystal, and laying the calcinated zeolite crystal on the metal substrate to obtain the first metal substrate.

15. The method for fabricating the oriented zeolite film of claim 14, wherein calcinating the zeolite crystal comprises heating the zeolite crystal at 300-700° C. for at least 5 minutes.

* * * * *